Patented Apr. 25, 1939

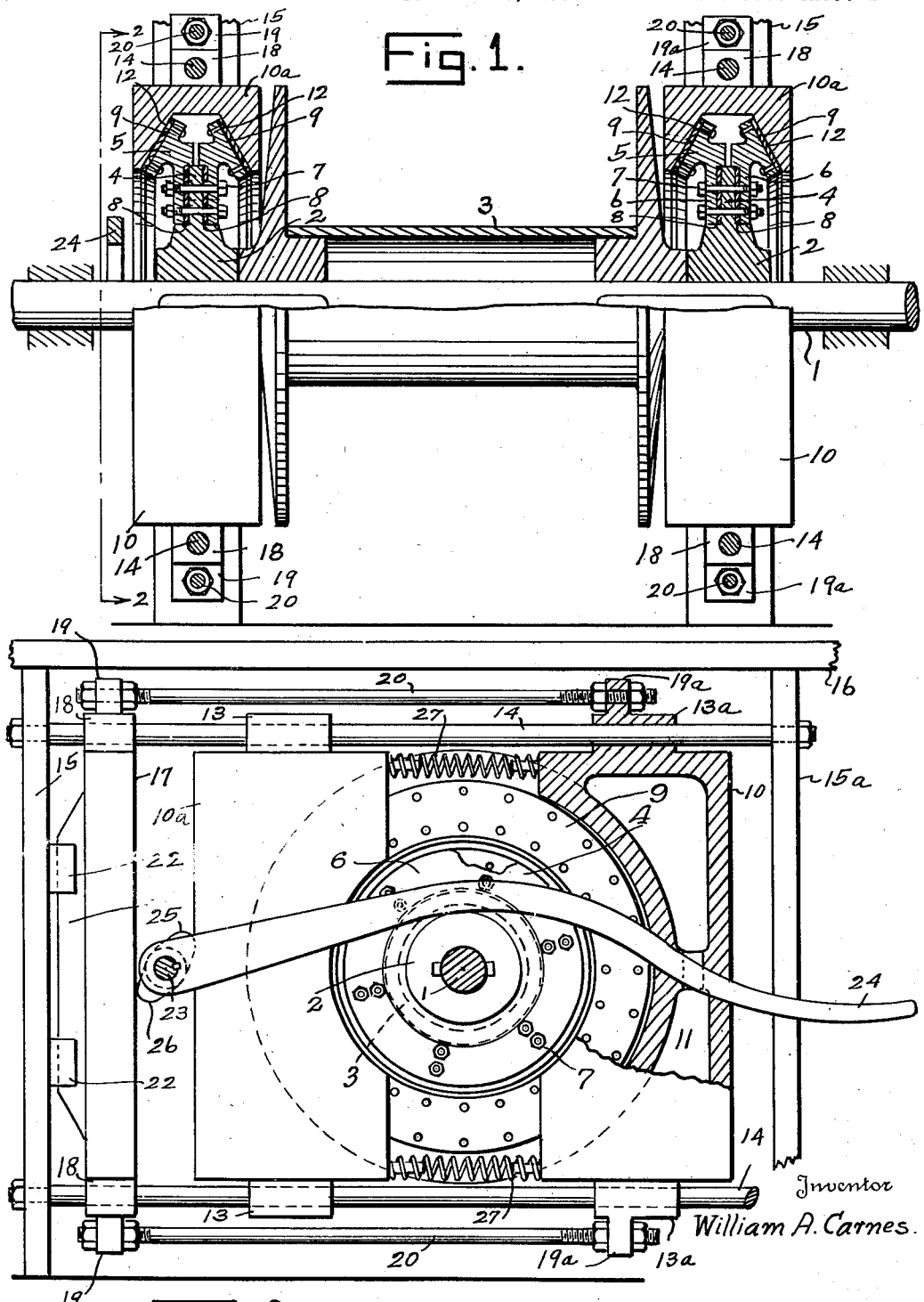

2,155,818

UNITED STATES PATENT OFFICE 2,155,818

BRAKE

William A. Carnes, Houston, Tex.

Application December 1, 1936, Serial No. 113,706

1 Claim. (Cl. 188—74)

This invention relates to a brake.

An object of the invention is to provide a brake specially designed for use on draw-works drums, although it is capable of use for other similar purposes and is specially adapted for heavy duty.

The invention embodies certain improvements over that type of brake disclosed in my co-pending application filed March 21, 1936, Serial No. 70,085.

Another object of the invention is to provide a brake comprising a drum provided with detachable, complemental brake shoes having outwardly converging friction surfaces capable of adjustment and opposing complemental segments having inwardly diverging friction surfaces and novel means for actuating the segments to move the friction surfaces into and out of braking relation.

It is another object of the invention to provide in brake mechanism novel means for mounting and actuating the brake segments.

With the above and other objects in view, the invention has particular relation to certain novel features of construction, operation and arrangement of parts, an example of which is given in this specification and illustrated in the accompanying drawings wherein:

Figure 1 shows a side elevation of a brake drum as shown partly in section, showing the brake segments associated therewith.

Figure 2 shows an end view partly in section taken on the line 2—2 of Figure 1.

Figure 3:
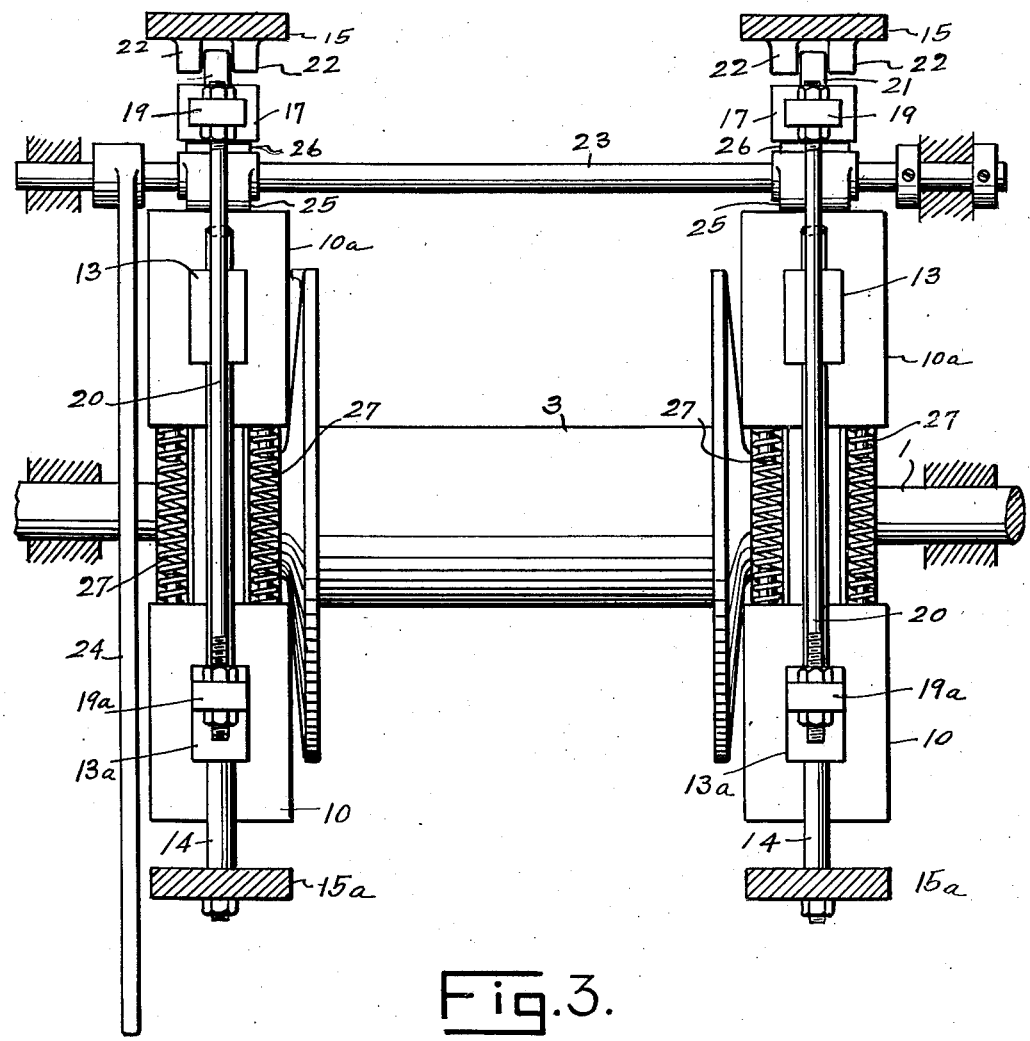
Figure 3 shows a horizontal sectional view.

Referring now more particularly to the drawings wherein like numerals of reference designate the same parts in each of the figures, the numeral 1 designates a drum shaft on which the brake drums 2, 2 are splined. A spool shaped cable winding drum 3 is located between the brake drums and is splined on the shaft 1.

The margin of each drum 2 is reduced in thickness forming an annular radial flange 4. On each drum are the brake shoes 5, 5. These shoes have the inside annular flanges 6, 6 which embraces corresponding flanges 4 and are secured thereto by bolts as 7. Between the flanges 6 and the corresponding flange 4 are the shims 8. These shims may be removed, or additional shims added thus providing for the adjustment of the shoes 5 toward and from each other. The outer surfaces of the shoes converge outwardly and are faced with suitable braking material 9, 9 thus forming friction surfaces. On opposite sides of each brake drum are the complemental segments 10, 10a which are preferably formed hollow and have the water circulating chambers 11 therein for cooling purposes and also having their inner sides arcuate and provided with inwardly diverging friction faces 12 which conform in shape to and are adapted to fit closely against the corresponding friction faces 9, 9 of the shoes.

The segments are oppositely arranged and have upper and lower bearings 13, 13a respectively to receive the upper and lower bearing rods 14, 14 which form tracks for the segments. The ends of these rods are anchored to suitable legs 15, 15a provided for the purpose and which are suitably secured together by the cross beams 16. Between the segments 10a and the corresponding legs 15 are the fulcrum bars 17, 17 whose upper and lower ends have the bearings 18, to receive the rods 14, on which the fulcrum bars are freely slidable. Each bearing 18 has a lug 19 and the bearings 13a have corresponding lugs 19a. The corresponding lugs 19, 19a above and below are connected by the upper and lower rods 20, 20. The fulcrum bars 17 have the longitudinal ribs 21, 21 on their outer sides which work between the spaced retainers 22, 22 on the facing side of the leg 15 as shown in Figures 2 and 3.

Between the fulcrum bars 17 and the segments 10a there is a transverse shaft 23 whose ends are mounted in suitable bearings of the framework as shown in Figure 3. Fixed on this shaft is an operating lever 24 whereby the shaft may be turned. The shaft 23 has the oppositely disposed cams 25, 26, the former of which work against the outer margins of the segments 10a and the latter of which work against the fulcrum bars 17.

Interposed between the upper and lower ends of the segments 10, 10a are the coiled push springs 27, 27 which normally hold the segments apart to release the brakes. When it is desired to set the brakes, the free end of the operating lever 24 may be actuated in a suitable direction to move the segments 10a and the opposing bars 17 apart. This will operate to force the segments 10a into braking relation with the brake shoes and at the same time will operate, through the fulcrum bars 17 and the rods 20 to actuate the segments 10 also into braking relation with said shoes to thus set the brake.

In case of wear between the friction surfaces of the shoes 5 and the segments 10, 10a additional shims 8 may be inserted for the purpose of taking up such wear.

The drawings and description disclose what is now considered to be a preferred form of the invention by way of illustration only, while the broad principle of the invention will be defined by the appended claim.

What I claim is:

A brake mechanism comprising a brake drum having an external brake surface, complemental segments having inside surfaces which conform to the shape of and which are adapted to cooperate with the drum surface, parallel bearing rods arranged on opposite sides of the drum and forming tracks, bearings on the segments through which the rods extend, a fulcrum bar having end bearings mounted to move on the rod, a brake lever, oppositely disposed cams operative by the lever and arranged between and directly operable against one segment and said bar, means connecting said bar to the other segment, said cams being effective upon operation thereof to cause simultaneous actuation of both segments into braking relation with the drum and means for simultaneously moving the sections into released position upon release of said lever.

WILLIAM A. CARNES.